United States Patent
Omura et al.

(10) Patent No.: US 11,031,163 B2
(45) Date of Patent: Jun. 8, 2021

(54) GRAIN-ORIENTED ELECTRICAL STEEL SHEET AND METHOD FOR MANUFACTURING THE SAME

(71) Applicant: JFE STEEL CORPORATION, Tokyo (JP)

(72) Inventors: Takeshi Omura, Tokyo (JP); Shigehiro Takajo, Tokyo (JP); Hirotaka Inoue, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 199 days.

(21) Appl. No.: 16/068,121

(22) PCT Filed: Jan. 24, 2017

(86) PCT No.: PCT/JP2017/002381
§ 371 (c)(1),
(2) Date: Jul. 4, 2018

(87) PCT Pub. No.: WO2017/130980
PCT Pub. Date: Aug. 3, 2017

(65) Prior Publication Data
US 2019/0013126 A1    Jan. 10, 2019

(30) Foreign Application Priority Data
Jan. 25, 2016   (JP) .............. JP2016-011706

(51) Int. Cl.
*H01F 1/18* (2006.01)
*C21D 8/12* (2006.01)
(Continued)

(52) U.S. Cl.
CPC .............. *H01F 1/18* (2013.01); *C21D 8/1222* (2013.01); *C21D 8/1233* (2013.01);
(Continued)

(58) Field of Classification Search
CPC ........... H01F 1/18; H01F 1/147–14791; H01F 41/22; H01F 1/14716; H01F 1/14725;
(Continued)

(56) References Cited

U.S. PATENT DOCUMENTS 4,567,369 A    1/1986  Smith et al.
6,811,619 B2   11/2004 Hayakawa et al.
(Continued)

FOREIGN PATENT DOCUMENTS

CN    1400319 A     3/2003
CN    104024454 A   9/2014
(Continued)

OTHER PUBLICATIONS

Dec. 26, 2019, Office Action issued by the China National Intellectual Property Administration in the corresponding Chinese Patent Application No. 201780007520.7 with English language search report.
(Continued)

*Primary Examiner* — Anthony J Zimmer
*Assistant Examiner* — Dean Mazzola
(74) *Attorney, Agent, or Firm* — Kenja IP Law PC

(57) ABSTRACT

An excellent low noise property and excellent low iron loss property are obtained. A grain-oriented electrical steel sheet includes refined magnetic domains formed by electron beam irradiation. When the maximum magnetic flux density is 1.7 T, the grain-oriented electrical steel sheet has a residual magnetic flux density of 0.1 to 0.7 times the residual magnetic flux density before the electron beam irradiation and a maximum magnetizing force of 1.1 to 2.0 times the maximum magnetizing force before the electron beam irradiation.

5 Claims, 7 Drawing Sheets

(51) Int. Cl.
*H01F 1/147* (2006.01)
*C22C 38/00* (2006.01)
*C21D 9/46* (2006.01)
*H01F 41/22* (2006.01)

(52) U.S. Cl.
CPC ............. *C21D 8/1294* (2013.01); *C21D 9/46* (2013.01); *C22C 38/00* (2013.01); *H01F 1/147* (2013.01); *H01F 41/22* (2013.01); *C21D 8/1255* (2013.01); *C21D 2201/05* (2013.01)

(58) Field of Classification Search
CPC ............. H01F 1/14775; H01F 1/14783; H01F 1/14791; H01F 1/16; H01F 27/245; B23K 15/00; C21D 8/1222; C21D 8/1233; C21D 8/1294; C21D 9/46; C21D 8/1255; C21D 2201/05; C21D 8/12; C21D 8/1244; C21D 8/1283
See application file for complete search history.

(56) References Cited

U.S. PATENT DOCUMENTS

| | | | |
|---|---|---|---|
| 8,016,951 B2 * | 9/2011 | Arai et al. | |
| 9,536,658 B2 | 1/2017 | Omura et al. | |
| 10,026,533 B2 | 7/2018 | Takajo et al. | |
| 10,134,514 B2 | 11/2018 | Uesaka et al. | |
| 10,147,527 B2 | 12/2018 | Takajo et al. | |
| 2013/0206283 A1 | 8/2013 | Inoue et al. | |
| 2014/0360629 A1 | 12/2014 | Inoue et al. | |
| 2015/0034211 A1 * | 2/2015 | Takajo et al. | H01F 1/16 |
| 2015/0187474 A1 * | 7/2015 | Takajo | C21D 6/001 |
| | | | 148/112 |
| 2015/0310973 A1 | 10/2015 | Takajo et al. | |
| 2017/0016085 A1 | 1/2017 | Toda et al. | |

FOREIGN PATENT DOCUMENTS

| | | |
|---|---|---|
| CN | 104603309 A | 5/2015 |
| CN | 105008557 A | 10/2015 |
| EP | 2891726 A1 | 7/2015 |
| JP | S60136142 A | 7/1985 |
| JP | 2012036445 A | 2/2012 |
| JP | 2012036450 A | 2/2012 |
| JP | 2012172191 A | 9/2012 |
| JP | 2013159850 A | 8/2013 |
| JP | 2015161024 A | 9/2015 |
| KR | 1020140111276 A | 9/2014 |
| KR | 1020150036775 A | 4/2015 |
| KR | 1020150060959 A | 6/2015 |
| RU | 2358346 C1 | 6/2009 |
| WO | WO-2013094218 A1 * | 6/2013 |
| WO | 2013099272 A1 | 7/2013 |
| WO | WO-2014034128 A1 * | 3/2014 ........... C21D 8/1244 |
| WO | 2014068962 A1 | 5/2014 |
| WO | WO-2014034128 A1 * | 6/2014 |

OTHER PUBLICATIONS

Yushen Tang, Development Trend of Metallic Functional Materials, Oct. 1988, p. 211.
Sep. 20, 2019, Office Action issued by the Canadian Intellectual Property Office in the corresponding Canadian Patent Application No. 3,012,101.
Nov. 22, 2019, Office Action issued by the Korean Intellectual Property Office in the corresponding Korean Patent Application No. 10-2018-7023274 with English language Concise Statement of Relevance.
May 15, 2018, Notification of Reasons for Refusal issued by the Japan Patent Office in the corresponding Japanese Patent Application No. 2017-528979 with English language Concise Statement of Relevance.
May 9, 2017, International Search Report issued in the International Patent Application No. PCT/JP2017/002381.
Jul. 1, 2019, Office Action issued by the Federal Service for Intellectual Property, Patents and Trademarks of the Russian Federation in the corresponding Russian Patent Application No. 2018130630 with English language search report.
Oct. 17, 2018, the Extended European Search Report issued by the European Patent Office in the corresponding European Patent Application No. 17744210.0.
Nov. 13, 2018, Decision of Refusal issued by the Japan Patent Office in the corresponding Japanese Patent Application No. 2017-528979 with English language concise statement of relevance.
Apr. 26, 2019, Office Action issued by the Korean Intellectual Property Office in the corresponding Korean Patent Application No. 10-2018-7023274 with English language concise statement of relevance.
May 7, 2019, Office Action issued by the State Intellectual Property Office in the corresponding Chinese Patent Application No. 201780007520.7 with English language search report.
May 22, 2020, Office Action issued by the Canadian Intellectual Property Office in the corresponding Canadian Patent Application No. 3,012,101.
Jul. 17, 2020, Office Action issued by the China National Intellectual Property Administration in the corresponding Chinese Patent Application No. 201780007520.7 with English language concise statement of relevance.

* cited by examiner

GRAIN-ORIENTED ELECTRICAL STEEL SHEET AND METHOD FOR MANUFACTURING THE SAME

TECHNICAL FIELD

The present disclosure relates to a grain-oriented electrical steel sheet advantageously utilized for an iron core of a transformer or the like, and to a method for manufacturing the same.

BACKGROUND

A grain-oriented electrical steel sheet is mainly utilized as an iron core of a transformer and is required to exhibit superior magnetization characteristics, in particular low iron loss. To this end, it is important to highly align secondary recrystallized grains of a steel sheet with (110)[001] orientation (Goss orientation) and to reduce impurities in a product steel sheet.

Furthermore, since limits exist on crystal orientation control and impurity reduction, a technique has been proposed for refining magnetic domains by irradiating the steel sheet surface with a laser, plasma, an electron beam, or the like. For example, JP 2012-036450 A (PTL 1) discloses a technique to introduce thermal strain into a grain-oriented electrical steel sheet in a dotted-line arrangement in a direction that crosses the rolling direction of the steel sheet by electron beam irradiation, wherein strain is also introduced inside the steel sheet not only by optimizing the irradiated point interval and the irradiation energy but also by irradiating an electron beam onto the surface of the steel sheet, thereby refining the magnetic domain width and reducing iron loss. When introducing thermal strain, however, the magnetostriction increases, leading to the problem of an increase in the noise property of the transformer.

Techniques for improving the iron loss and noise due to the electron beam method include the following. JP 2012-172191 A (PTL 2) discloses a technique that, when performing magnetic domain refining treatment to irradiate an electron beam in point form, provides a grain-oriented electrical steel sheet that has an excellent iron loss property and noise property by controlling the retention time t per point and the point interval X in accordance with output of the electron beam.

JP 2012-036445 A (PTL 3) discloses a technique to increase the tension exerted on the steel sheet by a forsterite film and to control a diameter A of a region in which thermal strain is introduced by electron beam irradiation and a pitch B of the irradiation so as to provide a grain-oriented electrical steel sheet that has an excellent low noise property and low iron loss property in an actual transformer.

WO2014/068962 (PTL 4) discloses a technique for optimizing the rolling direction width, the sheet thickness direction depth, and the rolling direction introduction interval of the closure domains with the electron beam method. With these methods, the degradation of the transformer noise can be suppressed to some degree, and a good iron loss property can be obtained.

CITATION LIST

Patent Literature

PTL 1: JP 2012-036450 A
PTL 2: JP 2012-172191 A
PTL 3: JP 2012-036445 A
PTL 4: WO2014/068962

SUMMARY

Technical Problem

To conserve energy, however, further reduction in the iron loss of raw material is highly needed, and development of techniques for further reducing iron loss while continuing to suppress an increase in the noise of a transformer are desired.

The present disclosure has been developed in light of these considerations and proposes a grain-oriented electrical steel sheet and method for manufacturing the same that can achieve an excellent, low noise property and low iron loss property when assembled as an actual transformer.

Solution to Problem

When introducing strain by electron beam irradiation, the magnetic domains are refined, thereby improving the eddy current loss. On the other hand, hysteresis loss increases due to introduction of strain. Since the amount of improvement in eddy current loss is greater than the amount of hysteresis loss, the iron loss improves. The reason for increase in actual transformer noise generated when using material that has attained a good iron loss property is a decrease in the magnetostrictive property due to the introduction of strain. One effective way of further improving the iron loss property without impairing the current noise property of a transformer is to maintain the current amount of strain that is introduced while optimizing the distribution of introduced strain, controlling the magnetization behavior of the steel sheet, and improving the hysteresis loss.

As a result of examining ways to improve the iron loss without changing the magnetization behavior of the steel sheet or increasing the amount of introduced strain, it became clear, by controlling the energy intensity distribution and beam diameter of an electron beam and varying the residual magnetic flux density Br and the maximum magnetizing force Hmax of the raw material, that the hysteresis loss could actually be improved by strain introduction, despite the hysteresis loss typically increasing due to strain introduction, and an excellent iron loss property could be obtained at the same strain amount.

The present disclosure is based on the aforementioned discoveries and is configured as follows.

1. A grain-oriented electrical steel sheet comprising refined magnetic domains formed by electron beam irradiation,
wherein when a maximum magnetic flux density is 1.7 T, the grain-oriented electrical steel sheet has a residual magnetic flux density of 0.1 to 0.7 times the residual magnetic flux density before the electron beam irradiation and a maximum magnetizing force of 1.1 to 2.0 times the maximum magnetizing force before the electron beam irradiation.

2. A method for manufacturing a grain-oriented electrical steel sheet, the method comprising:
subjecting a steel slab to hot rolling to obtain a hot rolled steel sheet;
subjecting the hot rolled steel sheet to hot band annealing to obtain a hot rolled steel sheet after hot band annealing;
subjecting the hot rolled steel sheet after hot band annealing to cold rolling once or cold rolling twice or more with intermediate annealing in between to obtain a cold rolled steel sheet with a final sheet thickness;

subjecting the cold rolled steel sheet to decarburization annealing to obtain a cold rolled steel sheet after decarburization annealing;

applying an annealing separator including MgO to a surface of the cold rolled steel sheet after decarburization annealing and then subjecting the cold rolled steel sheet after decarburization annealing to final annealing to obtain a steel sheet after final annealing; and subjecting the steel sheet after final annealing to magnetic domain refining treatment with electron beam irradiation;

wherein during the magnetic domain refining treatment, the electron beam irradiation is performed with a beam diameter of 220 μm or less in an orthogonal direction that is orthogonal to a scanning direction of the electron beam, and with a ratio of beam maximum intensity in the orthogonal direction with respect to beam maximum intensity in the scanning direction of 0.7 or more to 1.3 or less.

3. The method for manufacturing a grain-oriented electrical steel sheet of 2., wherein the electron beam irradiation is performed using one or more beam control coils.

4. The method for manufacturing a grain-oriented electrical steel sheet of 2. or 3., wherein the electron beam irradiation is performed at an accelerating voltage of 90 kV or more.

5. The method for manufacturing a grain-oriented electrical steel sheet of 3. or 4., wherein the electron beam irradiation is performed using a stigmator.

Advantageous Effect

According to the present disclosure, a grain-oriented electrical steel sheet having low iron loss as a result of strain imparted by an electron beam can be provided with even lower iron loss without causing degradation of the noise property of a transformer in which the grain-oriented electrical steel sheet is stacked.

DETAILED DESCRIPTION

Figure 1:
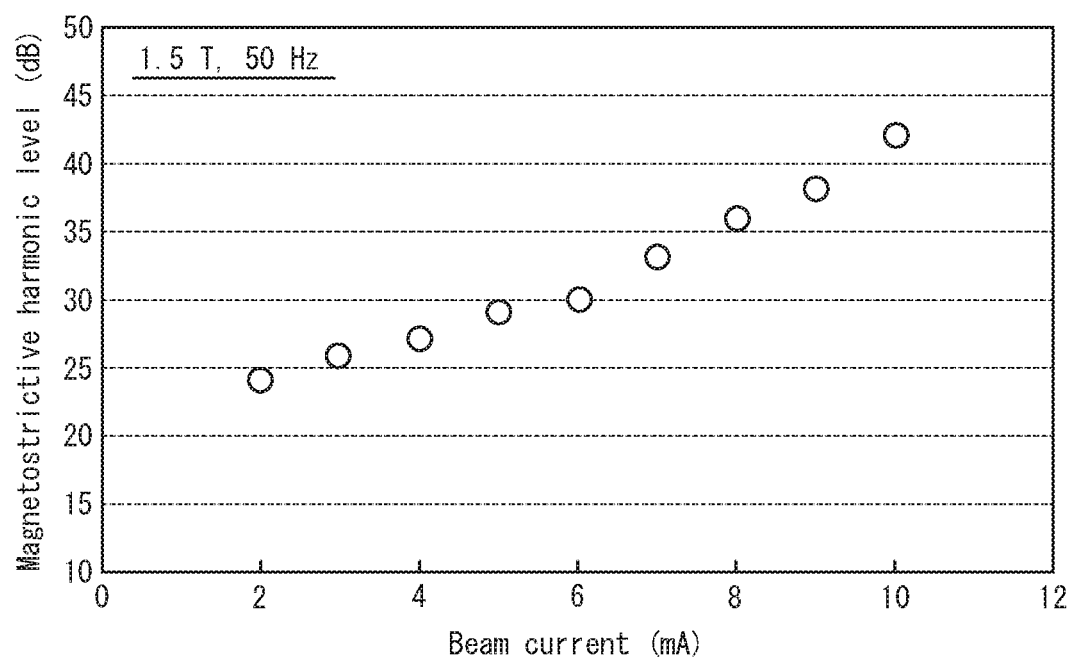
FIG. 1 is a graph illustrating the relationship between the beam current and the magnetostrictive harmonic level.

The present disclosure places no particular limitation on the type (chemical composition, structure, and the like) of grain-oriented electrical steel sheets used as the steel substrate, and any of various types of grain-oriented electrical steel sheets may be used.

The grain-oriented electrical steel sheet of the present embodiment may have a tension coating on the steel substrate surface. No particular limitation is placed on the type of tension coating. The tension coating may, for example, be a two-layer coating that is formed by a forsterite film, which is formed in final annealing and contains $Mg_2SiO_4$ as a main component, and a phosphate-based tension coating formed on the forsterite film. In addition, a phosphate-based tension-applying insulating coating may be directly formed on a surface of the steel substrate not having the forsterite film. The phosphate-based tension-applying insulating coating may be formed by, for example, coating a surface of the steel substrate with an aqueous solution containing a metal phosphate and silica as main components and then baking.

In the grain-oriented electrical steel sheet according to an embodiment of the present disclosure, an electron beam is irradiated in a direction cutting across the rolling direction on the surface of the steel sheet at intervals in the rolling direction, thereby introducing strain locally to the surface layer part of the steel substrate and forming strain regions, extending in the direction cutting across the rolling direction, at periodic intervals in the rolling direction.

A feature of the present embodiment is the clarification of the residual magnetic flux density level and the maximum magnetizing force level after electron beam irradiation that allow further improvement in the iron loss property by improving the hysteresis loss without causing the transformer noise to degrade. Another feature is the clarification of electron beam irradiation conditions for achieving these levels. Details are provided below.

First, we examined the raw material parameters having a high correlation with the amount of strain introduced by electron beam irradiation. As a result, we discovered that the magnetostrictive harmonic level (the noise level estimated from the measured value of the magnetostrictive vibration harmonic level (dB)) correlates highly with the transformer noise. In particular, we discovered that the change in the magnetostrictive harmonic level derived from the magnetostriction waveform of a steel sheet excited under the conditions of 1.5 T, 50 Hz is very sensitive to the amount of strain introduced. The magnetostrictive harmonic level at 1.5 T, 50 Hz is the value obtained by mounting a reflector on the surface of a steel sheet, performing frequency analysis on the expansion and contraction (magnetostriction waveform) of the steel sheet measured with a laser Doppler vibrometer, decomposing into velocity components every 100 Hz, and integrating the A-scale corrected value for each frequency component over a range of 100 Hz to 1000 Hz using the following Expressions.

Magnetostrictive Harmonic Level $$P = 20\log\left[\sqrt{\sum_n P_n^2} \bigg/ P_0\right] \quad \text{[Expression 1]}$$

$$P_0 = \lambda_0 f_0^2 \quad \text{[Expression 2]}$$

Here, $P_0$ represents reference sound pressure, $\lambda_0 = 10^{-9}$, and $f_0 = 100$ Hz.

$$P_n = \lambda_n f_n^2 \gamma_n \quad \text{[Expression 3]}$$

Here, $\lambda_n$ represents a vibration high-harmonic component, $f_n$ represents the frequency, and $\gamma_n$ represents the frequency weighting coefficient.

FIG. 1 illustrates the result of performing electron beam irradiation by changing the beam current under the conditions of an accelerating voltage of 60 kV, a dot pitch of 0.32 mm, an irradiation line pitch of 5.5 mm, and a scanning rate of 32 m/s and then deriving the magnetostrictive harmonic level for each sample. An increase in the beam current indicates an increase in the amount of strain introduced to the steel sheet, and the amount of strain introduced and the magnetostrictive harmonic level can be considered to correlate extremely well.

Figure 2:
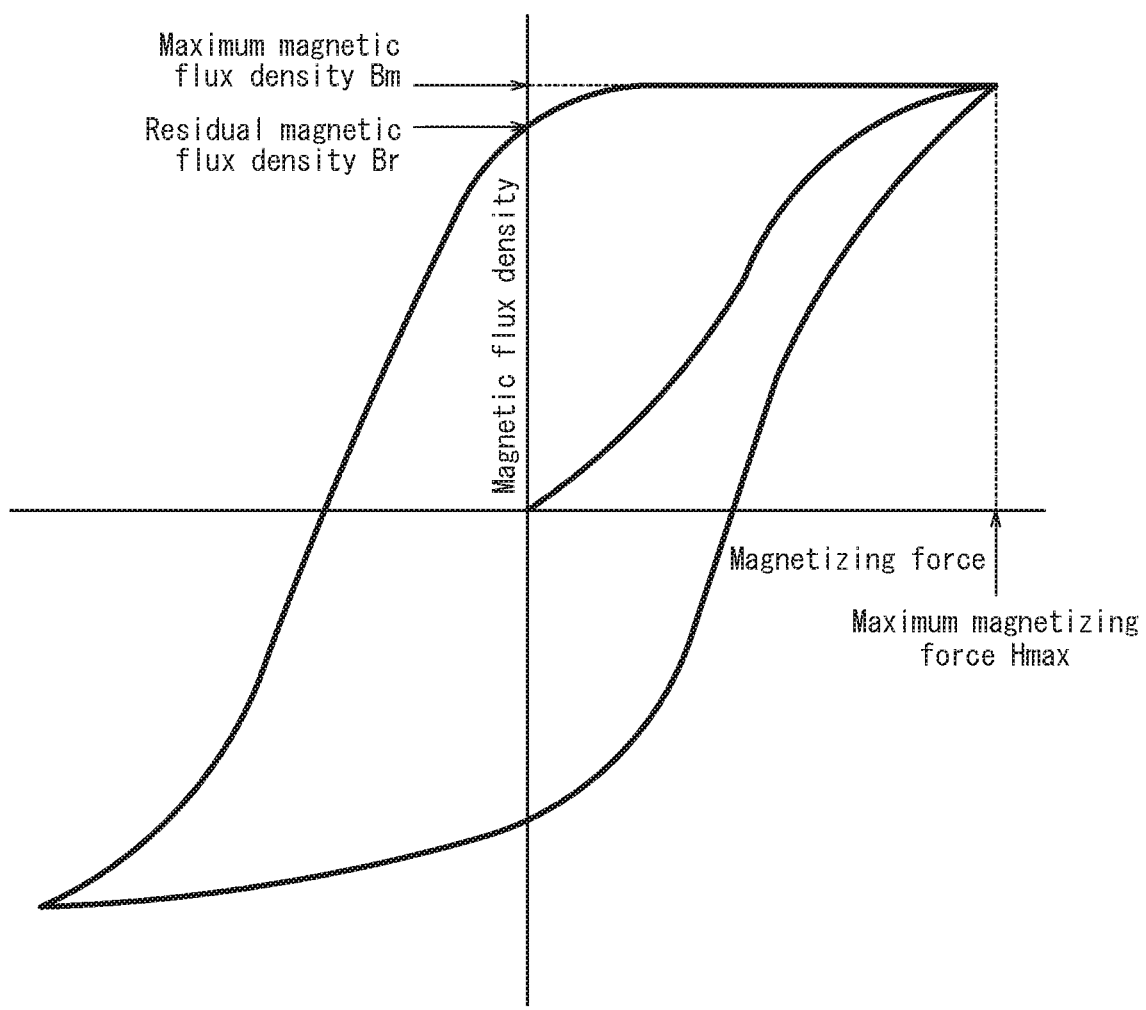
FIG. 2 is a graph illustrating a hysteresis loop.

As important parameters for improving the hysteresis loss, FIG. 2 illustrates the residual magnetic flux density Br and the maximum magnetizing force Hmax within a hysteresis loop when the maximum magnetic flux density (Bm) is 1.7 T. The hysteresis loss is proportional to the area of the portion enclosed by the hysteresis loop in FIG. 2. The maximum magnetizing force Hmax and the residual magnetic flux density Br exert a large influence on the area of this loop, and if either factor is small, the hysteresis loop decreases in size. It is therefore considered extremely important to control the rate of change in the residual magnetic flux density Br and the maximum magnetizing force before and after irradiation. The ratio before and after irradiation is preferably derived from measurement values obtained by measuring the residual magnetic flux density before irradiation and the maximum magnetizing force at the time of excitation at 1.7 T and subsequently measuring the sample after electron beam irradiation in the same way. However, for a sample after electron beam irradiation, the residual magnetic flux density and the maximum magnetizing force when the maximum magnetic flux density Bm is 1.7 T may be measured, stress relief annealing may be subsequently performed in a nitrogen atmosphere at 800° C. for 3 hours, and the residual magnetic flux density and maximum magnetizing force of the sample after annealing may be used as the values before electron beam irradiation. This is because the strain introduced by electron beam irradiation is released by stress relief annealing.

Figure 3:
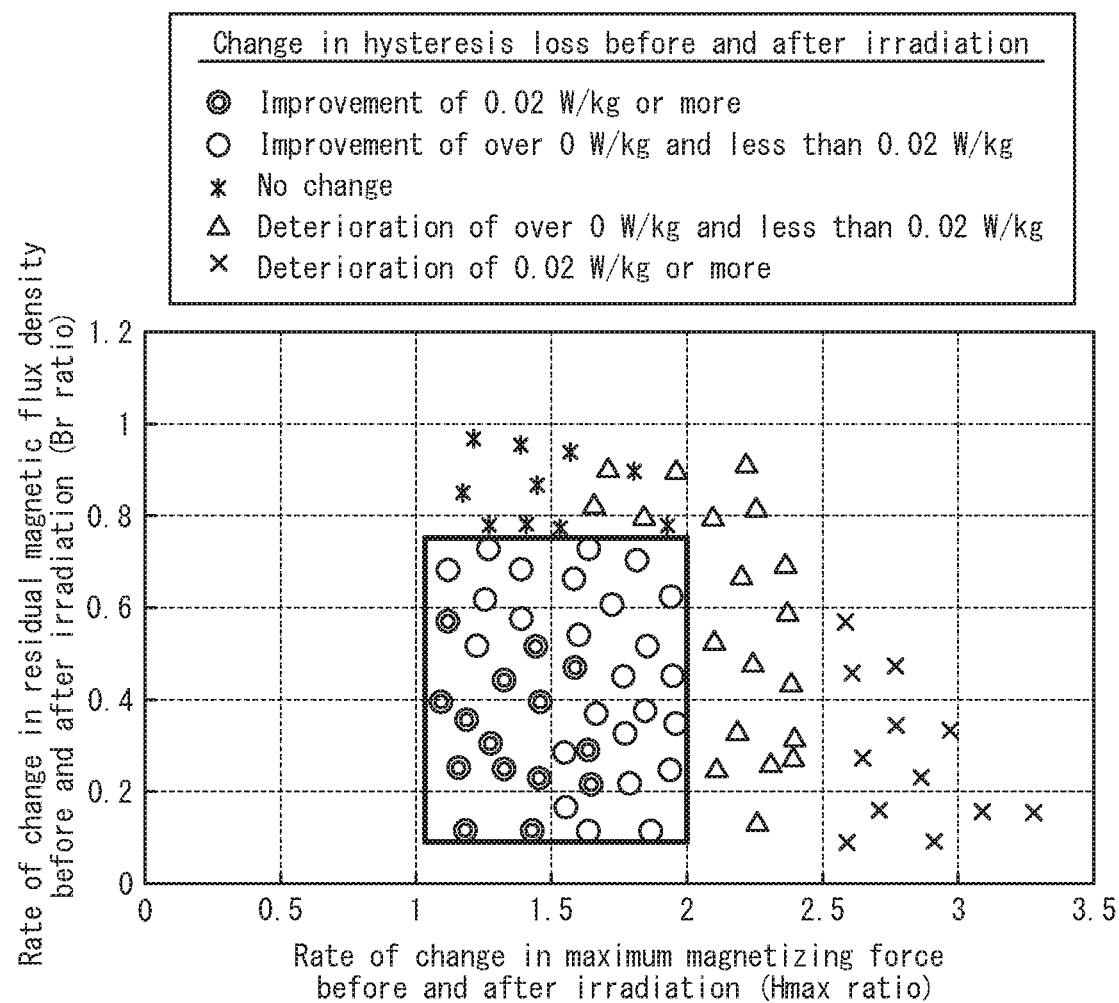
FIG. 3 is a graph illustrating the change in hysteresis loss before and after electron beam irradiation.

FIG. 3 illustrates the result of performing electron beam irradiation on a 0.27 mm thick grain-oriented electrical steel sheet by changing the accelerating voltage, the focusing current, and the beam current, measuring the hysteresis loss before and after the electron beam irradiation, and classifying the change in hysteresis loss in relation to the residual magnetic flux density and the maximum magnetizing force similarly measured before and after irradiation. Measurements were made by adjusting the irradiation conditions to obtain a constant magnetostrictive harmonic level and by introducing the same amount of strain. It was thought that the residual magnetic flux density and the maximum magnetizing force could have exerted a large influence on the increase and decrease in hysteresis loss, and therefore analysis focused on the residual magnetic flux density and the maximum magnetizing force. The analysis showed that by performing irradiation with the rate of change in the residual magnetic flux density before and after irradiation set from 0.1 or more to 0.7 or less and the rate of change in the maximum magnetizing force before and after irradiation set from 1.1 or more to 2.0 or less, the hysteresis loss after irradiation improves over the hysteresis loss before irradiation. The rate of change in the residual magnetic flux density before and after irradiation is preferably in a range of 0.1 or more to 0.5 or less. The rate of change in the maximum magnetizing force before and after irradiation is preferably in a range of 1.1 or more to 1.5 or less.

Figure 4:
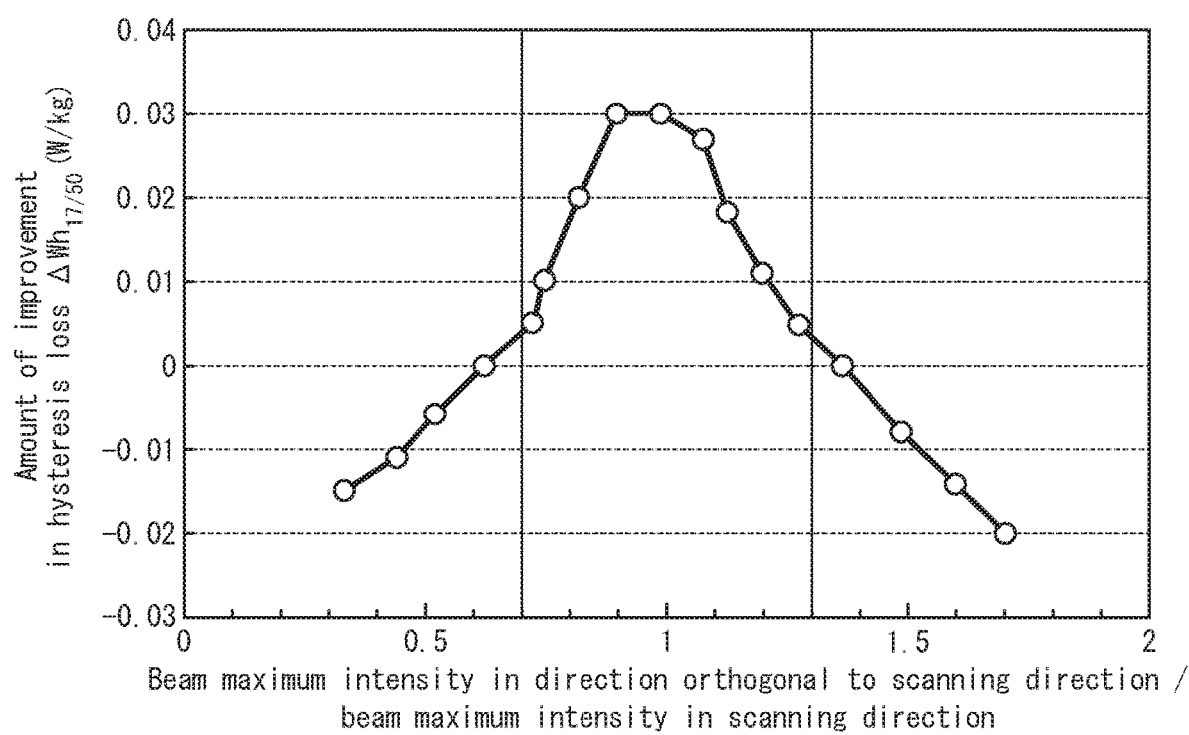
FIG. 4 is a graph illustrating the relationship between the ratio of the beam maximum intensity in a direction orthogonal to the scanning direction with respect to the beam maximum intensity in the scanning direction and the amount of improvement in hysteresis loss.

To clarify the reason behind improvement in the hysteresis loss, the beam diameter and energy intensity distribution of the electron beam were evaluated. Using the beam profile measured by a slit method (slit width 0.03 mm), the half width of the beam profile was considered to be the beam diameter, and the maximum value of the profile was considered to be the maximum energy intensity of the electron beam. FIG. 4 illustrates the relationship between (i) the amount of improvement in hysteresis loss of a steel sheet irradiated under an irradiation condition of the beam diameter in a direction orthogonal to the scanning direction being 120 µm to 160 µm and (ii) the ratio of the beam maximum intensity in the direction orthogonal to the scanning direction with respect to the beam maximum intensity in the scanning direction.

Figure 5:
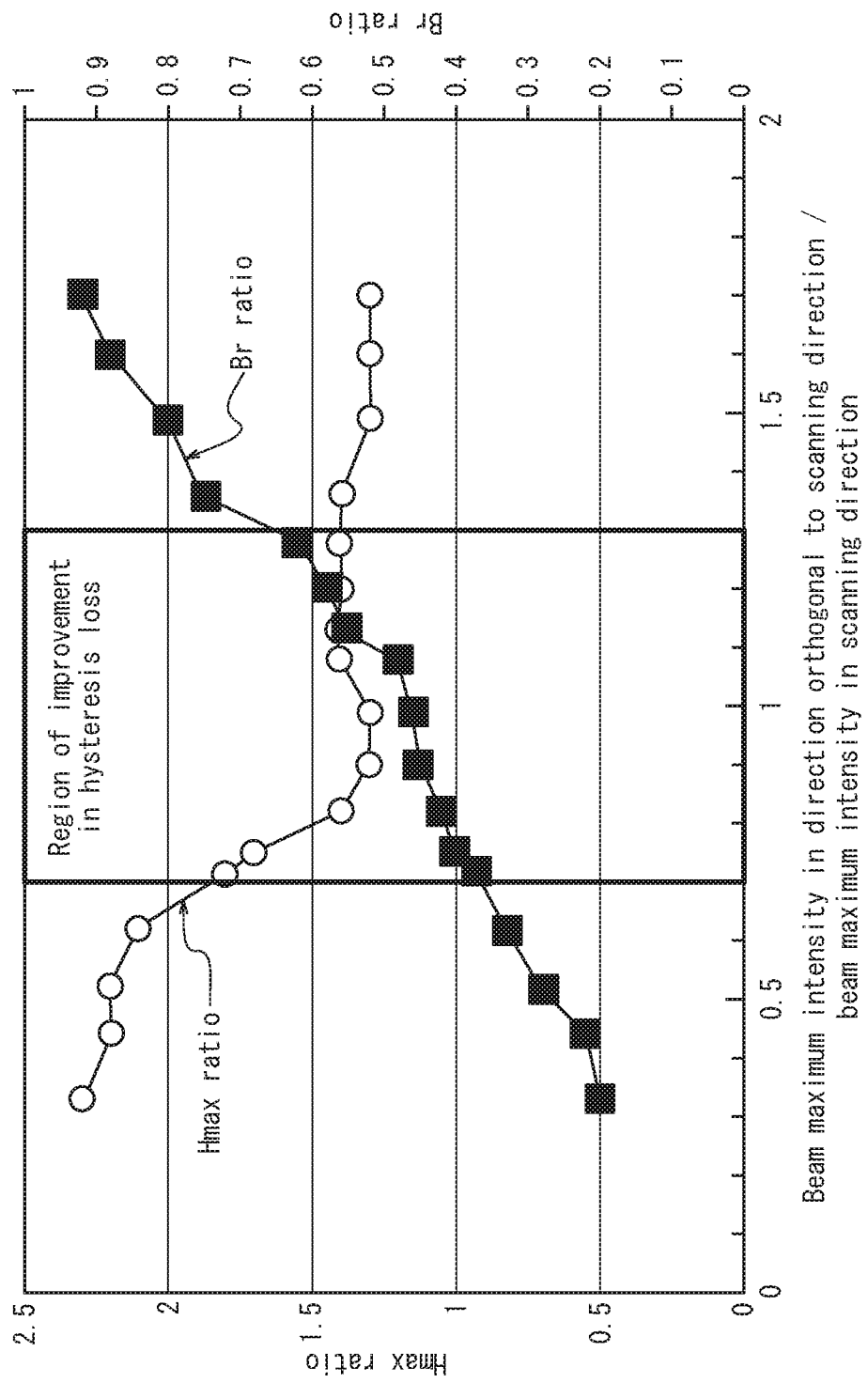
FIG. 5 is a graph illustrating the relationship between the Hmax ratio and Br ratio and the energy intensity distribution ratio.

The hysteresis loss improves when the maximum beam intensity ratio is 0.7 or more to 1.3 or less, and it is clearly important to introduce uniform strain with a beam having a uniform energy intensity distribution in which the energy intensity distributions in the rolling direction and the direction orthogonal to the rolling direction are as similar as possible. The maximum beam intensity ratio is more preferably 0.8 or more to 1.1 or less for better improvement in the hysteresis loss. Since Hmax and Br are parameters sensitive to strain, Hmax and Br can be adjusted by controlling the energy intensity distribution ratio, which allows a change in the distribution of introduced strain. FIG. 5 illustrates the relationship between (i) the Hmax ratio (white circles) and the Br ratio (black squares) and (ii) the energy intensity distribution ratio. It is clear from FIG. 5 that by setting the energy intensity distribution ratio close to 1 to make the strain distribution as uniform as possible, both the Hmax and Br ratios are controlled to be within the aforementioned preferred range.

Figure 6:
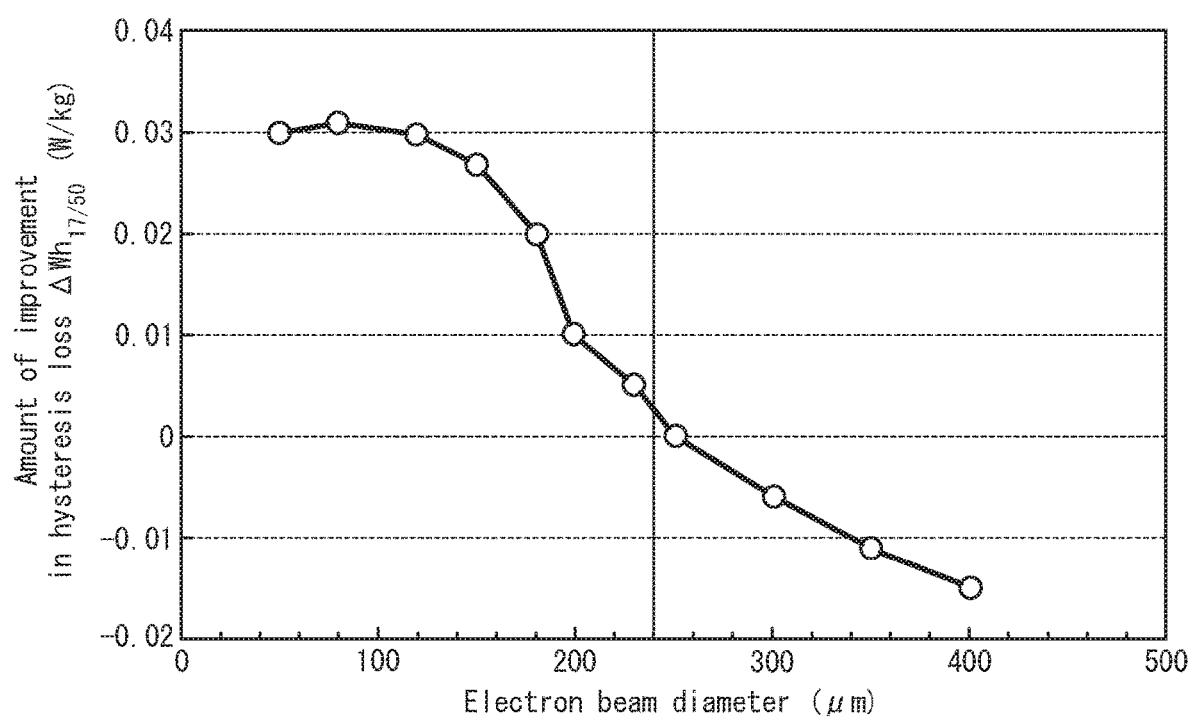
FIG. 6 is a graph illustrating the relationship between the electron beam diameter in a direction orthogonal to the scanning direction and the amount of improvement in hysteresis loss.
Figure 7:
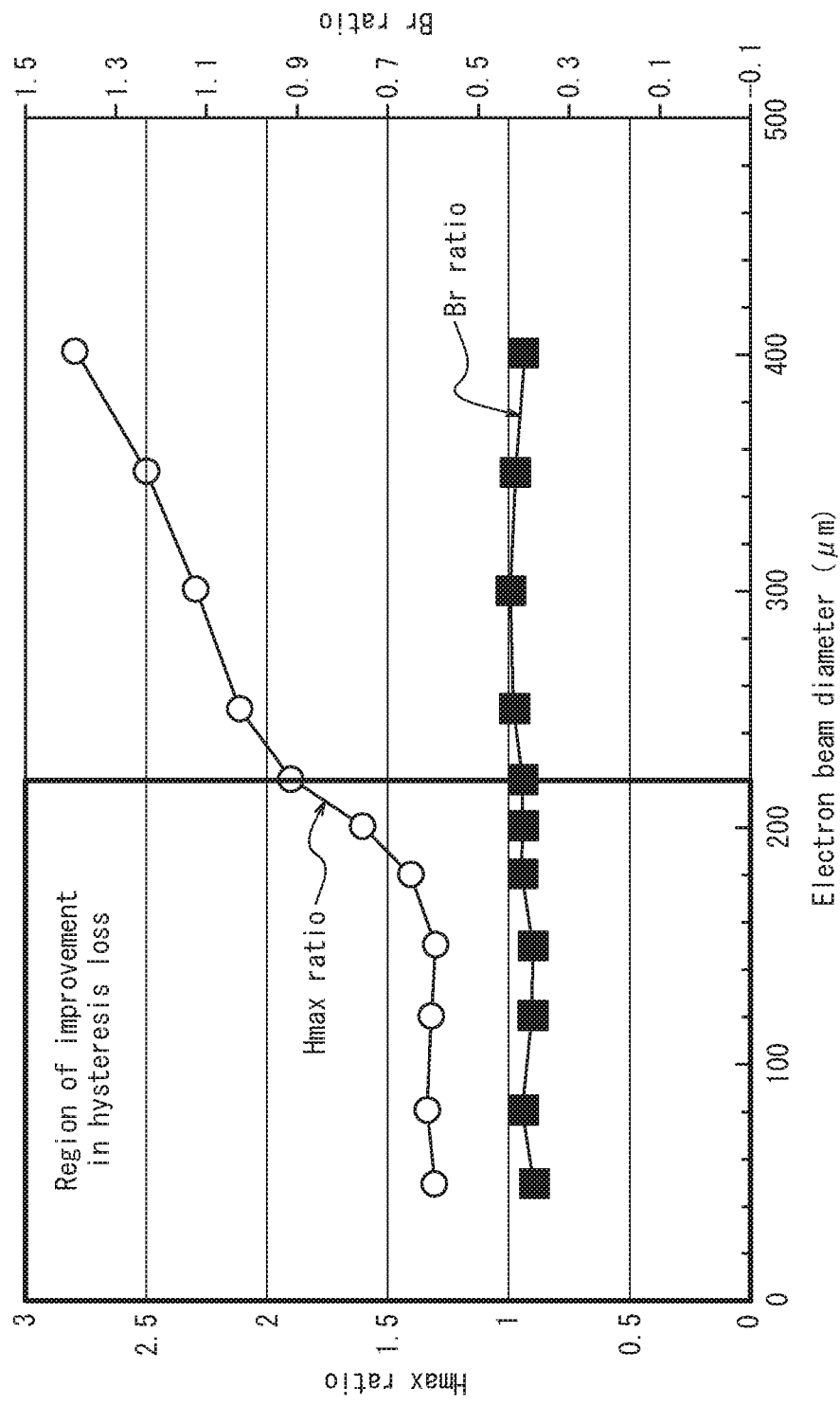
FIG. 7 is a graph illustrating the relationship between the Hmax ratio and Br ratio and the electron beam diameter.

Next, FIG. 6 illustrates the relationship between (i) the amount of improvement in hysteresis loss of a sample irradiated under the irradiation condition of a maximum beam intensity ratio of 1.0 and (ii) the beam diameter in a direction orthogonal to the scanning direction. It is clear that when the beam diameter of the electron beam is 220 µm or less, the hysteresis loss improves, whereas when the beam diameter exceeds this value, the hysteresis loss exhibits no change or degrades. Since the effect of hysteresis loss improvement disappears as the beam diameter increases, it is clearly important to irradiate the beam over as narrow of a region as possible to improve the hysteresis loss. Depending on the beam diameter, the range of strain introduction in the rolling direction of the irradiated portion changes. Hence, the beam diameter is also a factor that greatly influences Hmax and Br. FIG. 7 illustrates the relationship between (i) the Hmax ratio (white circles) and the Br ratio (black squares) and (ii) the beam diameter. It is clear from FIG. 7 that by setting the beam diameter to 220 µm or less to suppress the range of strain introduction in the rolling direction, both the Hmax ratio and Br ratio can be controlled to be within the aforementioned preferred range.

Effective methods for controlling the energy intensity distribution of the electron beam and the electron beam diameter include appropriate use of accelerating voltage, a focusing coil, or a stigmator. The accelerating voltage is preferably high. Electron linearity increases at high accelerating voltages. This increase in linearity is useful for focusing the beam in a narrow region. When the accelerating voltage is low, a high precision focusing technique becomes necessary to focus the beam in a narrow region, and the range over which the beam can be focused is limited to a narrow range. This tends to reduce stability, which is important for commercial production. For these reasons, the accelerating voltage is preferably 90 kV or more. The accelerating voltage is more preferably 150 kV or more. A practical upper limit is preferably approximately 300 kV, since a high accelerating voltage requires extensive measures against leakage of X-rays from the irradiated body.

As a method for controlling the beam diameter and the energy intensity distribution, a method for focusing the beam with a focusing coil (beam control coil) is useful. By rearranging the focusing coil and precisely controlling the current, the beam diameter and the energy intensity distribution can be controlled to be within a good range even when the accelerating voltage is low and the electrons have poor linearity. When using a combination of high accelerating voltage and a focusing coil, the preferred irradiation range expands and production stability improves if the focusing capability of the coil is sufficient. However, due to high electron linearity, the focusing capability of the coil may be insufficient, preventing the beam from being controlled as desired. In this case, a stable focusing capability can be obtained by using two or more focusing coils.

Besides using a focusing coil, another useful method for controlling the beam diameter and the energy intensity distribution is to use a stigmator. A stigmator is typically configured by a coil. The beam shape is corrected and adjusted by changing the current in the mutually orthogonal x-axis direction and y-axis direction of the coil. It is not impossible to control the beam diameter and energy intensity distribution to be within the preferred ranges with any single one of the above-described methods to control the beam shape using accelerating voltage, a focusing coil, or a stigmator. Nevertheless, by combining a plurality of methods, the electron beam irradiation conditions that allow irradiation with an appropriate beam diameter and energy intensity distribution can be controlled over a wider range, and stability significantly improves. A combination of the above-described methods is therefore preferably used.

The main points for implementing the present disclosure have been described. Other electron beam irradiation conditions are not particularly limited, but preferred irradiation conditions are described below.

The linear scanning direction of the electron beam is a direction forming an angle of 60° or more to 120° or less relative to the rolling direction. If the scanning direction differs from 90°, the irradiation area of the strain portion increases, restricting the preferred irradiation conditions. Hence, the scanning direction is preferably 90°.

The electron beam is preferably irradiated onto the steel sheet in a dotted pattern by repeatedly stopping and moving the beam. The dot pitch at this time (the distance between centers of adjacent dots) is preferably equal to or less than 2.5× the average beam diameter in the scanning direction. An increase in the pitch means a larger region where no strain is introduced between dots. Hence, if the pitch is greater than the aforementioned range, a sufficient magnetic domain refining effect cannot be obtained.

The average scanning rate is preferably 30 m/s or higher. High productivity cannot be achieved if the average scanning rate is less than 30 m/s. The average scanning rate is preferably 75 m/s or higher and more preferably 100 m/s or higher. Since dot irradiation control to repeatedly stop and move the beam becomes difficult as the scanning rate increases, the upper limit on the average scanning rate is preferably 300 m/s.

The irradiation line pitch is preferably 15 mm or less. This is because the magnetic domain refining effect decreases as the irradiation line pitch widens, impeding improvement in the iron loss. No particular lower limit is placed on the line pitch, but the pitch is preferably 5 mm or higher, since a narrow line pitch impairs the production capacity.

The beam current is preferably small in order to control the beam shape. This is because it becomes difficult for the beam to focus if charged particles repel each other. Hence, the upper limit on the beam current is 30 mA, more preferably 20 mA. If the beam current is too low, however, the magnetic domain refining effect is no longer obtained. The lower limit on the beam current is therefore preferably 0.5 mA to obtain the magnetic domain refining effect.

The pressure in the processing chamber is preferably set to 3 Pa or less. If the pressure is high, the electron beam is scattered by gas molecules, and it becomes extremely difficult to control the electron beam to be the required shape. A practical lower limit on the pressure is approximately $10^{-5}$ Pa, since the costs for vacuum control, such as a vacuum pump, increase if the pressure is excessively low.

The above findings were also examined for magnetic domain refining by laser irradiation, but the effects observed for electron beam irradiation were not obtained with laser irradiation. This is inferred to be because heat propagates to the steel sheet differently with a laser and an electron beam. In other words, it can easily be assumed that since an electron beam is highly transparent and easily penetrates in the sheet thickness direction, the resulting stress distribution differs from the case of laser irradiation. This difference is thought to be the reason why the above-described region with reduced hysteresis loss was not present upon performing magnetic domain refining with laser irradiation.

EXAMPLES

Steel slabs with a composition containing C: 0.055 mass %, Si: 3.05 mass %, Mn: 0.08 mass %, Ni: 0.02 mass %, Al: 190 mass ppm, N: 65 mass ppm, Se: 150 mass ppm, S: 10 mass ppm, and O: 15 mass ppm, with the balance substantially being Fe, were manufactured by continuous casting. After heating to 1450° C., the steel slabs were subjected to hot rolling to form hot rolled sheets, with a sheet thickness of 2.4 mm, which were then subjected to hot band annealing at 1025° C. for 300 s. Next, the steel sheets were subjected to cold rolling to have an intermediate sheet thickness of 0.60 mm, and then to intermediate annealing under the following conditions: a degree of oxidation $PH_2O/PH_2$ of 0.35, a temperature of 950° C., and a duration of 100 s. Subsequently, the steel sheets were subjected to pickling with hydrochloric acid to remove subscales from the surface thereof, followed by cold rolling again to be finished to cold rolled sheets having a sheet thickness of 0.30 mm.

Next, the steel sheets were subjected to decarburization annealing by holding for 60 s at a degree of oxidation $PH_2O/PH_2$ of 0.50 and a soaking temperature of 830° C. An annealing separator to which 2 parts by weight of $TiO_2$ was added to 100 parts by weight of MgO was then applied, and the steel sheets were subjected to final annealing at 1200° C. for 30 h for secondary recrystallization/forsterite film formation and for purification. Then, an insulation coating composed of 60% colloidal silica and aluminum phosphate was applied to each steel sheet, which in turn was baked at 800° C. This coating application process also serves as flattening annealing. Subsequently, an electron beam was irradiated perpendicularly to the rolling direction. At this time, the accelerating voltage and the usage conditions of the focusing coil and the stigmator were changed. Other irradiation conditions were a dot pitch of 0.20 mm, an irradiation line pitch of 6.0 mm, a scanning rate of 60 m/s and a processing chamber pressure of 0.01 Pa. The magnetic properties were evaluated for product samples subjected to magnetic domain refining treatment on one side by the above method. The change in the residual magnetic flux density and maximum magnetizing force before and after irradiation were derived from the magnetic properties of the samples after irradiation and the magnetic properties after stress relief annealing at 800° C. for 3 h in a $N_2$ atmosphere. Each of the steel sheet product samples was then sheared into specimens having beveled edges and assembled into a 500 kVA three-phase transformer, and iron loss and noise were measured in an excited state at 50 Hz and 1.7 T.

The measurement conditions and measurement results are shown in Table 1. Since the magnetostrictive harmonic level was the same for all of the samples, the total amount of introduced strain can be considered to be the same. In the case of a low accelerating voltage of 60 kV, Sample Nos. 1 to 4 show that optimal conditions (Sample No. 3) for reducing the iron loss do exist when not utilizing items that allow a change in the electron beam shape, such as use of multiple focusing coils or a stigmator. However, these optimal conditions are clearly unstable, as they cease to exist upon a 2 mA shift in the focusing current. Even if the accelerating voltage is low, applying the aforementioned beam control items (Sample Nos. 5 to 8) can clearly expand the optimal condition range. Under a high accelerating voltage condition as well, it is clear that using the beam control items expands the optimal irradiation condition range, and using a two-stage focusing coil and a stigmator not only expands the optimal irradiation range but also increases the amount of improvement in iron loss.

TABLE 1

| Sample No. | Accelerating voltage (kV) | Number of focusing coils | Focusing current (mA) | Use of stigmator | Beam diameter (μm) | Ratio of beam maximum intensities in scanning direction and orthogonal direction | Magnetostrictive harmonic level (1.5 T, 50 Hz) |
|---|---|---|---|---|---|---|---|
| 1 | 60 | 1 | 680 | no | 350 | 0.4 | 33 |
| 2 | 60 | 1 | 682 | no | 280 | 0.7 | 33 |
| 3 | 60 | 1 | 684 | no | 200 | 0.8 | 33 |
| 4 | 60 | 1 | 686 | no | 240 | 0.6 | 33 |
| 5 | 60 | 1 | 680 | yes | 300 | 0.6 | 33 |
| 6 | 60 | 1 | 682 | yes | 240 | 0.8 | 33 |
| 7 | 60 | 1 | 684 | yes | 180 | 0.9 | 33 |
| 8 | 60 | 1 | 686 | yes | 200 | 0.8 | 33 |
| 9 | 150 | 1 | 870 | no | 200 | 1.7 | 33 |
| 10 | 150 | 1 | 872 | no | 180 | 1.5 | 33 |
| 11 | 150 | 1 | 874 | no | 120 | 1.2 | 33 |
| 12 | 150 | 1 | 876 | no | 150 | 1.2 | 33 |
| 13 | 150 | 2 | 718 | no | 180 | 0.6 | 33 |
| 14 | 150 | 2 | 720 | no | 160 | 0.8 | 33 |
| 15 | 150 | 2 | 722 | no | 100 | 0.9 | 33 |
| 16 | 150 | 2 | 724 | no | 120 | 0.9 | 33 |
| 17 | 150 | 2 | 718 | yes | 160 | 0.9 | 33 |
| 18 | 150 | 2 | 720 | yes | 140 | 0.9 | 33 |
| 19 | 150 | 2 | 722 | yes | 80 | 0.9 | 33 |
| 20 | 150 | 2 | 724 | yes | 100 | 0.9 | 33 |

| Sample No. | Rate of change in residual magnetic flux density | Rate of change in maximum magnetizing force | Magnetic flux density $B_8$ (T) | Material properties (1.7 T, 50 Hz) Iron loss (W/kg) | Material properties (1.7 T, 50 Hz) Hysteresis loss (W/kg) | Transformer properties (1.7 T 50 Hz) Iron loss (W/kg) | Transformer properties (1.7 T 50 Hz) Noise (dBA) | Notes |
|---|---|---|---|---|---|---|---|---|
| 1 | 0.5 | 3.0 | 1.93 | 0.91 | 0.30 | 1.14 | 53 | Comparative Example |
| 2 | 0.5 | 2.5 | 1.93 | 0.90 | 0.29 | 1.13 | 53 | Comparative Example |
| 3 | 0.6 | 1.8 | 1.93 | 0.89 | 0.28 | 1.11 | 53 | Example |
| 4 | 0.8 | 1.8 | 1.93 | 0.90 | 0.29 | 1.13 | 53 | Comparative Example |
| 5 | 0.5 | 2.7 | 1.93 | 0.90 | 0.29 | 1.13 | 53 | Comparative Example |
| 6 | 0.5 | 2.2 | 1.93 | 0.90 | 0.29 | 1.13 | 53 | Comparative Example |
| 7 | 0.5 | 1.5 | 1.93 | 0.88 | 0.27 | 1.10 | 53 | Example |
| 8 | 0.5 | 1.5 | 1.93 | 0.88 | 0.27 | 1.10 | 53 | Example |
| 9 | 0.8 | 2.0 | 1.93 | 0.90 | 0.29 | 1.13 | 53 | Comparative Example |
| 10 | 0.8 | 1.8 | 1.93 | 0.90 | 0.29 | 1.13 | 53 | Comparative Example |
| 11 | 0.5 | 1.5 | 1.93 | 0.88 | 0.27 | 1.10 | 53 | Example |
| 12 | 0.5 | 1.5 | 1.93 | 0.88 | 0.27 | 1.10 | 53 | Example |
| 13 | 0.6 | 2.4 | 1.93 | 0.90 | 0.29 | 1.13 | 53 | Comparative Example |
| 14 | 0.6 | 1.8 | 1.93 | 0.88 | 0.27 | 1.10 | 53 | Example |
| 15 | 0.4 | 1.3 | 1.93 | 0.87 | 0.26 | 1.09 | 53 | Example |
| 16 | 0.4 | 1.2 | 1.93 | 0.87 | 0.26 | 1.09 | 53 | Example |
| 17 | 0.4 | 1.4 | 1.93 | 0.87 | 0.26 | 1.09 | 53 | Example |
| 18 | 0.4 | 1.4 | 1.93 | 0.87 | 0.26 | 1.09 | 53 | Example |
| 19 | 0.4 | 1.2 | 1.93 | 0.87 | 0.26 | 1.09 | 53 | Example |
| 20 | 0.4 | 1.2 | 1.93 | 0.87 | 0.26 | 1.09 | 53 | Example |

The invention claimed is:

1. A grain-oriented electrical steel sheet comprising refined magnetic domains,
wherein, in a condition excited by a magnetic field having a maximum magnetic flux density of 1.7 T, the grain-oriented electrical steel sheet has:
(i) a residual magnetic flux density that is 0.1 to 0.7 times the residual magnetic flux density measured after the grain-oriented electrical steel sheet is subjected to annealing in a nitrogen atmosphere at 800° C. for 3 hours, and
(ii) a maximum magnetizing force that is 1.1 to 2.0 times the maximum magnetizing force measured after the grain-oriented electrical steel sheet is subjected to annealing in a nitrogen atmosphere at 800° C. for 3 hours.

2. The grain-oriented electrical steel sheet comprising refined magnetic domains according to claim 1, wherein the grain-oriented electrical steel sheet has a hysteresis loss at 50 Hz and 1.7 T of 0.28 W/kg or less.

3. The grain-oriented electrical steel sheet comprising refined magnetic domains according to claim 1, wherein the grain-oriented electrical steel sheet has:
(i) a residual magnetic flux density that is 0.1 to 0.5 times the residual magnetic flux density measured after the grain-oriented electrical steel sheet is subjected to annealing in a nitrogen atmosphere at 800° C. for 3 hours, and
(ii) a maximum magnetizing force that is 1.1 to 1.5 times the maximum magnetizing force measured after the grain-oriented electrical steel sheet is subjected to annealing in a nitrogen atmosphere at 800° C. for 3 hours.

4. The grain-oriented electrical steel sheet comprising refined magnetic domains according to claim 2, wherein the grain-oriented electrical steel sheet has:
(i) a residual magnetic flux density that is 0.1 to 0.5 times the residual magnetic flux density measured after the grain-oriented electrical steel sheet is subjected to annealing in a nitrogen atmosphere at 800° C. for 3 hours, and
(ii) a maximum magnetizing force that is 1.1 to 1.5 times the maximum magnetizing force measured after the grain-oriented electrical steel sheet is subjected to annealing in a nitrogen atmosphere at 800° C. for 3 hours.

5. A method for manufacturing the grain-oriented electrical steel sheet of claim 1, the method comprising:
subjecting a steel slab to hot rolling to obtain a hot rolled steel sheet;
subjecting the hot rolled steel sheet to hot band annealing to obtain a hot rolled steel sheet after hot band annealing;
subjecting the hot rolled steel sheet after hot band annealing to cold rolling once or cold rolling twice or more with intermediate annealing in between to obtain a cold rolled steel sheet with a final sheet thickness;
subjecting the cold rolled steel sheet to decarburization annealing to obtain a cold rolled steel sheet after decarburization annealing;
applying an annealing separator including MgO to a surface of the cold rolled steel sheet after decarburization annealing and then subjecting the cold rolled steel sheet after decarburization annealing to final annealing to obtain a steel sheet after final annealing; and
subjecting the steel sheet after final annealing to magnetic domain refining treatment with electron beam irradiation;
wherein during the magnetic domain refining treatment, the electron beam irradiation is performed with a beam diameter of 220 μm or less in an orthogonal direction that is orthogonal to a scanning direction of the electron beam, and with a ratio of beam maximum intensity in the orthogonal direction with respect to beam maximum intensity in the scanning direction of 0.7 or more to 1.3 or less; and
wherein the electron beam irradiation is performed using two or more beam control coils, an accelerating voltage of 90 kV or more, and a stigmator,
thereby producing the grain-oriented electrical steel sheet of claim 1.

* * * * *